US012627756B2

(12) United States Patent \
 Agrawal et al.

(10) Patent No.: US 12,627,756 B2 \
(45) Date of Patent: May 12, 2026

(54) ADAPTIVE ALARM MANAGEMENT IN AN ELECTRONIC DEVICE

(71) Applicant: MOTOROLA MOBILITY LLC, Wilmington, DE (US)

(72) Inventors: Amit Kumar Agrawal, Bangalore (IN); Krishnan Raghavan, Bangalore (IN)

(73) Assignee: Motorola Mobility LLC, Chicago, IL (US)

( * ) Notice: Subject to any disclaimer, the term of this patent is extended or adjusted under 35 U.S.C. 154(b) by 387 days.

(21) Appl. No.: 18/496,891

(22) Filed: Oct. 29, 2023

(65) Prior Publication Data

US 2025/0141991 A1     May 1, 2025

(51) Int. Cl.

| | |
|---|---|
| *G04G 13/02* | (2006.01) |
| *G06F 40/205* | (2020.01) |
| *G06F 40/279* | (2020.01) |
| *H04M 1/72451* | (2021.01) |

(52) U.S. Cl.
CPC ........ *H04M 1/72451* (2021.01); *G04G 13/02* (2013.01); *G06F 40/205* (2020.01); *G06F 40/279* (2020.01)

(58) Field of Classification Search
CPC ..... G04G 13/02; G04G 13/021; G04G 13/026
See application file for complete search history.

(56) References Cited

U.S. PATENT DOCUMENTS

| | | | | |
|---|---|---|---|---|
| 10,095,372 B2 * | 10/2018 | Raghavan | ............... | H04W 4/14 |
| 10,108,150 B1 * | 10/2018 | Gheorghita | ............ | G04G 15/00 |
| 10,924,443 B1 * | 2/2021 | Clymer | ................. | H04L 67/306 |
| 11,194,294 B2 * | 12/2021 | Raymann | ............... | G06F 9/451 |
| 2011/0195727 A1 * | 8/2011 | Proulx | .................... | H04L 67/52 |
| | | | | 455/456.3 |
| 2014/0089417 A1 * | 3/2014 | Van Os | ................. | H04L 51/224 |
| | | | | 709/206 |
| 2017/0238864 A1 * | 8/2017 | Raymann | .............. | H04L 67/535 |

* cited by examiner

*Primary Examiner* — Edwin A. Leon \
*Assistant Examiner* — Jason M Collins \
(74) *Attorney, Agent, or Firm* — Isidore PLLC

(57) ABSTRACT

An electronic device, a method and a computer program product for managing alarms. The method includes detecting, via a processor of an electronic device configured with alarm functionality, activation of a first alarm. The first alarm set to trigger at a first time. The method includes monitoring for receipt of incoming communications that are not attended to by a user of the electronic device and identifying that an incoming communication contains information that warrants performing an alarm modification corresponding to the first alarm. In response to identifying that the incoming communication contains the information that warrants performing an alarm modification, the method includes determining a time adjustment period based on the at least one information message. The method includes adjusting the first time, by the time adjustment period, to generate a second time and updating the first alarm to be triggered at the second time.

20 Claims, 9 Drawing Sheets

| Incoming Communications 260 | Alarm Event ID 510 | Original Alarm Time 520 | Time Adjustment Period 316 | Adjusted Alarm Time 530 |
|---|---|---|---|---|
| Calendar Event: 7:30 AM meeting re-scheduled to to 8:30 AM | Wake-up Time | 7:00 AM | 60 minutes | 8:00 AM |
| Text Message: School dismissal early today at 3:00 PM | School Pickup Time | 2:30 PM | 30 minutes | 2:00 PM |

Example 502

Example 504

ADAPTIVE ALARM MANAGEMENT IN AN ELECTRONIC DEVICE

BACKGROUND

1. Technical Field

The present disclosure generally relates to electronic devices that include an alarm function and in particular to managing the alarm function of an electronic device.

2. Description of the Related Art

Electronic devices, such as mobile phones, tablets, and laptops, are widely used for video, voice, and text communication and for data transmission. Electronic devices are commonly used to send and receive communications such as text messages and e-mails. Many of these electronic devices also provide an alarm function that is utilized by the device user. An alarm is an audio and/or visual signal to alert a user to an event or condition that requires the user's action or attention. Alarms assist users in waking-up on time, managing schedules and staying organized. For example, an alarm function/feature of an electronic device can be set to provide a particular alarm signal (e.g., a tone), at a pre-set time, to wake a person from sleeping. In another example, an alarm function of an electronic device can be set to provide an alarm tone, at a pre-set time, to remind a person of an appointment or meeting. Once the alarm of the electronic device is set to the pre-set time, the alarm will be activated at the pre-set time, unless/until manually changed by the user.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 5 is an example illustration of a table of incoming communications and corresponding alarm adjustments based on information contained in the incoming communications, according to one or more embodiments;

DETAILED DESCRIPTION

Figure 1:
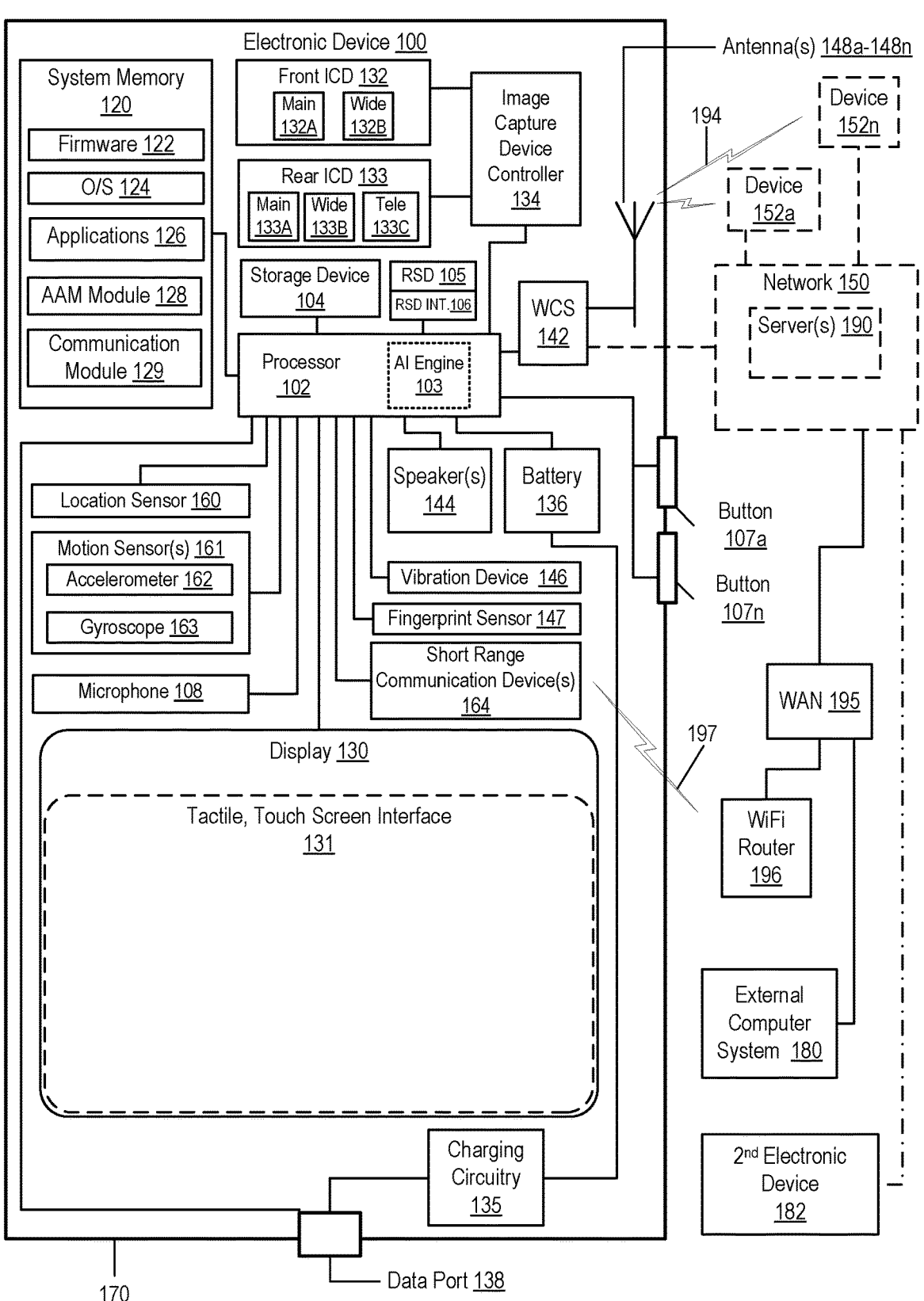
FIG. 1 depicts an example electronic device within which various aspects of the disclosure can be implemented, according to one or more embodiments.

According to one aspect of the disclosure, the illustrative embodiments provide an electronic device, a method, and a computer program product for managing at least one alarm of the electronic device. In a first embodiment, an electronic device includes a memory having stored thereon an adaptive alarm management (AAM) module for managing at least one alarm of the electronic device. The electronic device includes at least one processor that is communicatively coupled to the memory. The at least one processor executes program code of the adaptive alarm management module, which enables the electronic device to detect activation of a first alarm. The first alarm is set to trigger at a first time. The at least one processor monitors for receipt of incoming communications that are not attended to by a user of the electronic device and identifies that an incoming communication contains at least one information that warrants performing an alarm modification corresponding to the first alarm. In response to identifying that the incoming communication contains the at least one information warranting an alarm modification corresponding to the first alarm, the at least one processor determines a time adjustment period based on the at least one information. The at least one processor adjusts the first time, by the time adjustment period, to generate a second time, and updates the first alarm to be triggered at the second time.

According to another embodiment, the method includes detecting, via at least one processor of an electronic device configured with alarm functionality, activation of a first alarm. The first alarm set to trigger at a first time. The method includes monitoring for receipt of incoming communications that are not attended to by a user of the electronic device and identifying that an incoming communication contains at least one information warranting an alarm modification corresponding to the first alarm. In response to identifying that the incoming communication contains the at least one information that warrants performing an alarm modification corresponding to the first alarm, the method includes determining a time adjustment period based on the at least one information message. The method includes adjusting the first time, by the time adjustment period, to generate a second time and updating the first alarm to be triggered at the second time.

According to an additional embodiment, a computer program product includes a computer readable storage device having stored thereon program code that, when executed by at least one processor of an electronic device, the program code enables the electronic device to complete the functionality of the above-described method processes.

The above contains simplifications, generalizations and omissions of detail and is not intended as a comprehensive description of the claimed subject matter but, rather, is intended to provide a brief overview of some of the functionality associated therewith. Other systems, methods, functionality, features, and advantages of the claimed subject matter will be or will become apparent to one with skill in the art upon examination of the figures and the remaining detailed written description. The above as well as additional objectives, features, and advantages of the present disclosure will become apparent in the following detailed description.

Users of electronic devices configured with alarm functions/features often set an alarm to alert the user of an upcoming event that is scheduled to occur at a particular time. The particular time of the event is often utilized by the user to determine what time the alarm is to be set for. Frequently, changes/updates can occur to the original times that are associated with the alarm event or conditions. For example, a scheduled meeting can be cancelled or the meeting time can be changed to an earlier or later time. With a conventional alarm function, once the alarm of the electronic device is set to the pre-set time, the alarm will be activated at the pre-set time unless/until manually changed by the user. The present disclosure provides the benefits of the device being able to autonomously adjust an alarm time based on received communication that can provide a change in the time of the scheduled event.

In the following description, specific example embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various aspects are described which may be aspects for some embodiments but not other embodiments.

The terminology used herein is for the purpose of describing particular embodiments only and is not intended to be limiting of the disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Moreover, the use of the terms first, second, etc. do not denote any order or importance, but rather the terms first, second, etc. are used to distinguish one element from another.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be provided its broadest interpretation given the context in which that term is utilized.

Those of ordinary skill in the art will appreciate that the hardware components and basic configuration depicted in the following figures may vary. For example, the illustrative components within electronic device 100 (FIG. 1) are not intended to be exhaustive, but rather are representative to highlight components that can be utilized to implement the present disclosure. For example, other devices/components may be used in addition to, or in place of, the hardware depicted. The depicted example is not meant to imply architectural or other limitations with respect to the presently described embodiments and/or the general disclosure.

Within the descriptions of the different views of the figures, the use of the same reference numerals and/or symbols in different drawings indicates similar or identical items, and similar elements can be provided similar names and reference numerals throughout the figure(s). The specific identifiers/names and reference numerals assigned to the elements are provided solely to aid in the description and are not meant to imply any limitations (structural or functional or otherwise) on the described embodiments.

FIG. 1 depicts an example electronic device 100 within which various aspects of the disclosure can be implemented, according to one or more embodiments. Examples of such electronic devices include, but are not limited to, mobile devices, a notebook computer, a mobile phone, a digital camera, a smart watch, a tablet computer, and a communication device, etc. It is appreciated that electronic device 100 can be other types of devices that include capability to receive an incoming communication as well as providing an alarm notification feature/function. Electronic device 100 includes processor 102, which is communicatively coupled to storage device 104, system memory 120, input devices, (introduced below), output devices, such as display 130, and image capture device (ICD) controller 134. In one or more embodiments, the functionality of ICD controller 134 is incorporated within processor 102, eliminating the need for a separate ICD controller. For simplicity in describing the features presented herein, the various camera control functions performed by the ICD controller 134 are described as being provided generally by processor 102. Processor 102 can include processor resources such as a central processing unit (CPU) that support computing, classifying, processing and transmitting of data and information. Processor 102 can further include graphic processing units (GPU) and digital signal processors (DSP) that also support computing, classifying, processing and transmitting and receiving of data and information. Processor 102 can further include a hardware based artificial intelligence (AI) engine 103. AI engine 103 accelerates artificial intelligence, natural language processing (NLP), context evaluation (CE), and machine learning applications. AI engine 103 can also be implemented as a software module.

System memory 120 may be a combination of volatile and non-volatile memory, such as random access memory (RAM) and read-only memory (ROM). System memory 120 can store program code and data associated with firmware 122, an operating system 124, applications 126, adaptive alarm management (AAM) module 128, and communication module 129. AAM module 128 includes program code that is executable by processor 102 to enable electronic device 100 to manage at least one alarm of electronic device 100. Communication module 129 includes program code that is executed by processor 102 to enable electronic device 100 to communicate with other external devices and systems.

Although depicted as being separate from applications 126, AAM module 128 and communication module 129 may each be implemented as an application. Processor 102 loads and executes program code stored in system memory 120, including program code associated with applications 122 and program code associated with AAM module 128 and communication module 129. When processed/executed by processor 102, the program code causes or configures electronic device 100 to provide the various functionality described herein.

In one or more embodiments, electronic device includes removable storage device (RSD) 105, which is inserted into an RSD interface 106 that is communicatively coupled via system interlink to processor 102. In one or more embodiments, RSD 105 is a non-transitory computer program product or computer readable storage device. In one or more embodiments, RSD 105 is a computer readable storage device encoded with program code and corresponding data, and RSD 105 can interchangeably be referred to as a non-transitory computer program product. RSD 105 may have a version of AAM module 128 stored thereon, in addition to other program code. Processor 102 can access RSD 105 to provision electronic device 100 with program code that, when executed by processor 102, the program code causes or configures electronic device 100 to provide the functionality described herein.

Display 130 can be one of a wide variety of display screens or devices, such as a liquid crystal display (LCD) and an organic light emitting diode (OLED) display. In some embodiments, display 130 can be a touch screen device that can receive user tactile/touch input. As a touch screen device, display 130 includes a tactile, touch screen interface 131 that allows a user to provide input to or to control electronic device 100 by touching features presented within/below the display screen. Tactile, touch screen interface 131 can be utilized as an input device.

Throughout the disclosure, the term image capturing device is utilized interchangeably to be synonymous with and/or refer to any one of front or rear cameras 132, 133. As illustrated, electronic device 100 includes several front cameras 132. Electronic device 100 further includes several rear cameras 133. Each front camera 132A and 132B and each rear camera 133A, 133B and 133C is communicatively coupled to ICD controller 134, which is communicatively coupled to processor 102. ICD controller 134 supports the processing of signals from front cameras 132A and 132B and rear cameras 133A, 133B, and 133C.

Electronic device 100 can further include charging circuitry 135, battery 136, and data port 138, for providing electrical power to the various electronic components of electronic device 100. Electronic device 100 further includes microphone 108, one or more output devices such as speakers 144, and one or more input buttons 107a-n. Input buttons 107a-n may provide controls for volume, power, and/or image capture devices 132, 133. Microphone 108 can also be referred to as audio input device 108. Microphone 108 can be used to provide biometric data to identify or authenticate a user. Microphone 108 and input buttons 107a-n can also be referred to generally as input devices. Speakers 144 can provide an audio alert to a user, such as an alarm tone, after an alarm of electronic device 100 has been triggered.

Electronic device 100 further includes wireless communication subsystem (WCS) 142, which is coupled to antennas 148a-148n. In one or more embodiments, WCS 142 can include a communication module with one or more baseband processors or digital signal processors, one or more modems, and a radio frequency front end having one or more transmitters and one or more receivers. Wireless communication subsystem (WCS) 142 and antennas 148a-148n allow electronic device 100 to communicate wirelessly with wireless network 150 via transmissions of communication signals 194 to and from network communication devices 152a-152n, such as base stations or cellular nodes, of wireless network 150.

In one or more embodiment, wireless network 150 can include one or more servers 190 that support wireless exchange of voice, data, and video and other communication with electronic device 100. Wireless network 150 further allows electronic device 100 to communicate with an external computer system 180 and second electronic device 182. External computer system 180 is communicatively coupled to wireless network 150 by a wide area network (WAN) 195, such as the Internet. In an embodiment, servers 190 of wireless network 150 support wireless exchange of e-mail, text, data, and other communication between electronic device 100 and external computer system 180.

Second electronic device 182 is also communicatively coupled to wireless network 150. Second electronic device 182 can be similarly connected to wireless network 150, via one of network communication devices 152a-152n. In an embodiment, servers 190 of wireless network 150 support wireless exchange of voice, text, data, and video and other communication between electronic device 100 and second electronic device 182.

Electronic device 100 further includes short range communication device(s) 164. Short-range communication device 164 is a low powered transceiver that can wirelessly communicate with other devices. Short-range communication device(s) 164 can include one or more of a variety of devices supporting different corresponding wireless protocols, such as a near field communication (NFC) device, a Bluetooth device, and/or a wireless fidelity (Wi-Fi) device. Electronic device 100 can also connect wirelessly to wireless network 150 via communication signals 197 transmitted by short-range communication device(s) 164 to and from WiFi router 196, which is communicatively coupled to WAN 195, such as the Internet. Wireless network 150 is communicatively coupled to WAN 195.

Short-range communication device(s) 164 can wirelessly communicate with WiFi router 196 via communication signals 197. In one embodiment, electronic device 100 can receive Internet or Wi-Fi based calls via short-range communication device(s) 164. In one embodiment, electronic device 100 can communicate with WiFi router 196 wirelessly via short-range communication device(s) 164. In an embodiment, WCS 142, antennas 148a-148n and short-range communication device(s) 164 collectively provide communication interface(s) of electronic device 100.

Electronic device 100 further includes vibration device 146, fingerprint sensor 147, location sensor 160, and motion sensor(s) 161. Vibration device 146 can cause electronic device 100 to vibrate or shake when activated. Vibration device 146 can be activated during an incoming call or message or an alarm event in order to provide an alert or notification to a user of electronic device 100. According to one aspect of the disclosure, display 130, speakers 144, and vibration device 146 can generally and collectively be referred to as output devices.

Fingerprint sensor 147 can be used to provide biometric data or images to identify or authenticate a user. Location sensor 160 can provide time data and location data about the physical location of electronic device 100. In one embodiment, location sensor 160 can be a global positioning system (GPS) device that uses data received from geospatial input received from GPS satellites.

Motion sensor(s) 161 can include one or more accelerometers 162 and gyroscope 163. Motion sensor(s) 161 can detect movement of electronic device 100 and provide motion data to processor 102 indicating the spatial orientation and movement of electronic device 100. Accelerometers 162 measure linear acceleration of movement of electronic device 100 in multiple axes (X, Y and Z). For example, accelerometers 162 can include three accelerometers, where one accelerometer measures linear acceleration in the X axis, one accelerometer measures linear acceleration in the Y axis, and one accelerometer measures linear acceleration in the Z axis. Gyroscope 163 measures rotation or angular rotational velocity of electronic device 100. Electronic device 100 further includes a housing 170 that contains the components of electronic device 100.

In the description of each of the following figures, reference is also made to specific components illustrated within the preceding figure(s). Similar or same components are presented with the same reference number.

Figure 2:
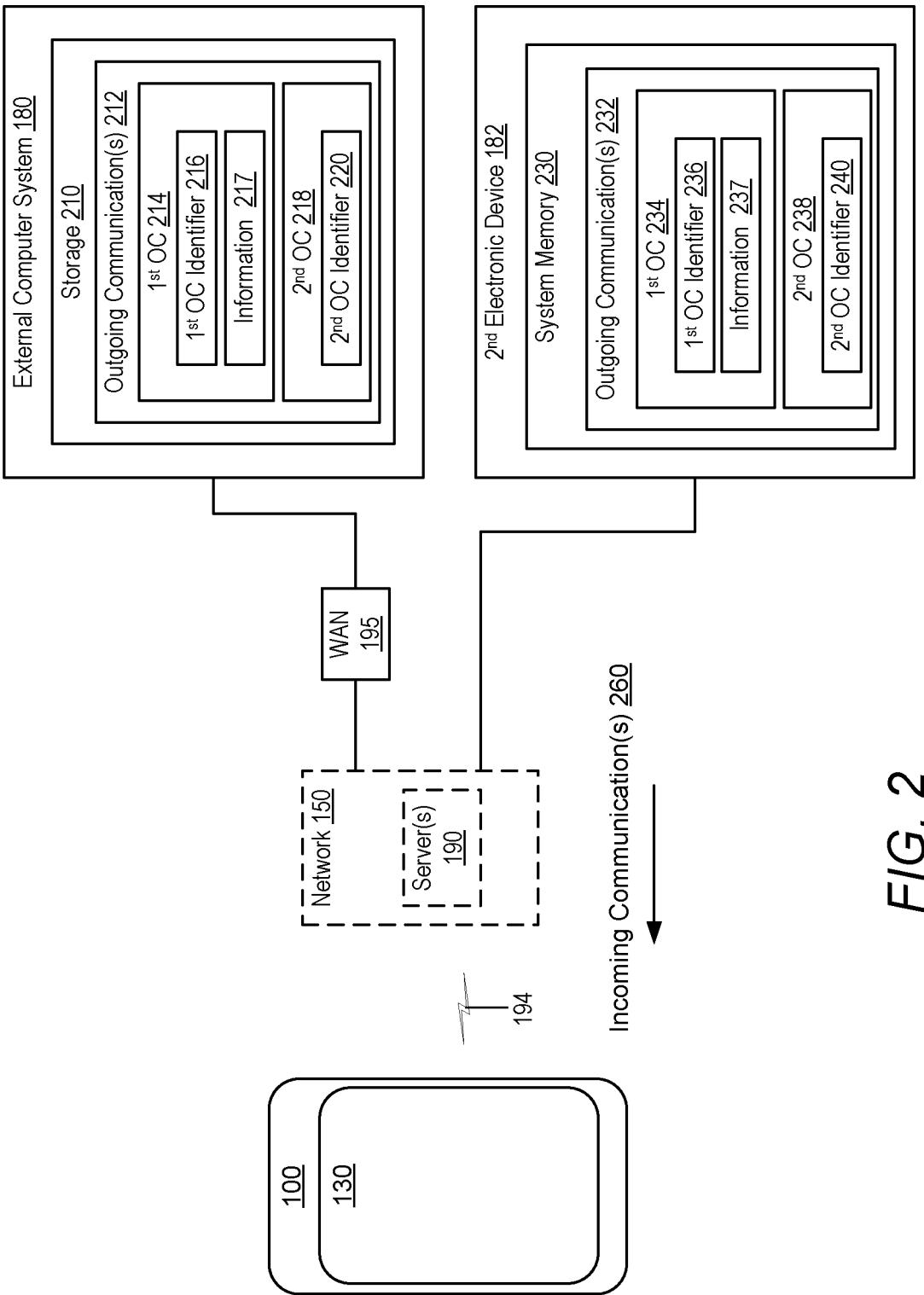
FIG. 2 is an example illustration of the example electronic device of FIG. 1 receiving incoming communications from an external computer system and a second electronic device, according to one or more embodiments.

Turning to FIG. 2, electronic device 100 is shown in communication with external computer system 180 and second electronic device 182. External computer system 180 is communicatively coupled to wireless network 150 by a wide area network (WAN) 195, such as the Internet. In an embodiment, servers 190 of wireless network 150 support wireless exchange of e-mail, text, data, and other communication between electronic device 100 and external computer system 180.

Electronic device 100 can communicate wirelessly with wireless network 150 via transmission and reception of communication signals 194. Communication network 150 includes communication servers 190 that are communicatively connected to a larger, wide area network (WAN) 195, such as the Internet. Electronic device 100 can also establish connection and communicate with wireless network 150 and with WAN 195 via WiFi router 196 and short-range communication device(s) 164 (FIG. 1).

External computer system 180 includes storage 210, such as one or more hard drives or solid state drives. Storage 210 can store outgoing communications 212 including first outgoing communication (OC) 214 and second outgoing communication (OC) 218. The first and second outgoing communications 214, 218 can be a wide variety of electronic communications such as e-mail, text, data, voice, instant messages and other communication types. First outgoing communication 214 includes a first outgoing communication identifier (ID) 216 and second outgoing communication 218 includes a second outgoing communication identifier (ID) 220. The first and second outgoing communication identifiers 216, 220 ascertain or identify the source of the outgoing communication. In an example embodiment, the first and second outgoing communication identifiers 216, 220 can be the sender of a text or the sender of an e-mail.

Second electronic device 182 can include similar components to the components previously described for electronic device 100. Second electronic device 182 includes system memory 230, such as random access memory (RAM) and read-only memory (ROM). System memory 230 can store outgoing communications 232 including first outgoing communication (OC) 234 and second outgoing communication (OC) 238. The first and second outgoing communications 234, 238 can be a wide variety of electronic communications such as e-mail, text, data, voice, instant messages and other communication types. First outgoing communication 234 includes a first outgoing communication identifier (ID) 236 and second outgoing communication 238 includes a second outgoing communication identifier (ID) 240. The first and second outgoing communication identifiers ascertain or identify the source of the outgoing communication. In an example embodiment, the first and second outgoing communication identifiers 236, 240 can be the sender of a text or the sender of an e-mail. In another example embodiment, the first and second outgoing communication identifiers 236, 240 can identifier a primary user of second electronic device 182.

According to one aspect of the disclosure, electronic device 100 can receive incoming communication(s) 260 from at least one of external computer system 180 and second electronic device 182. The incoming communication (s) 260 can correspond to at least one of outgoing communications 212 and 232. In one embodiment, the incoming communication 260 can include information 217 or 237 that warrants or triggers an alarm modification to at least one alarm of electronic device 100.

Figure 3:
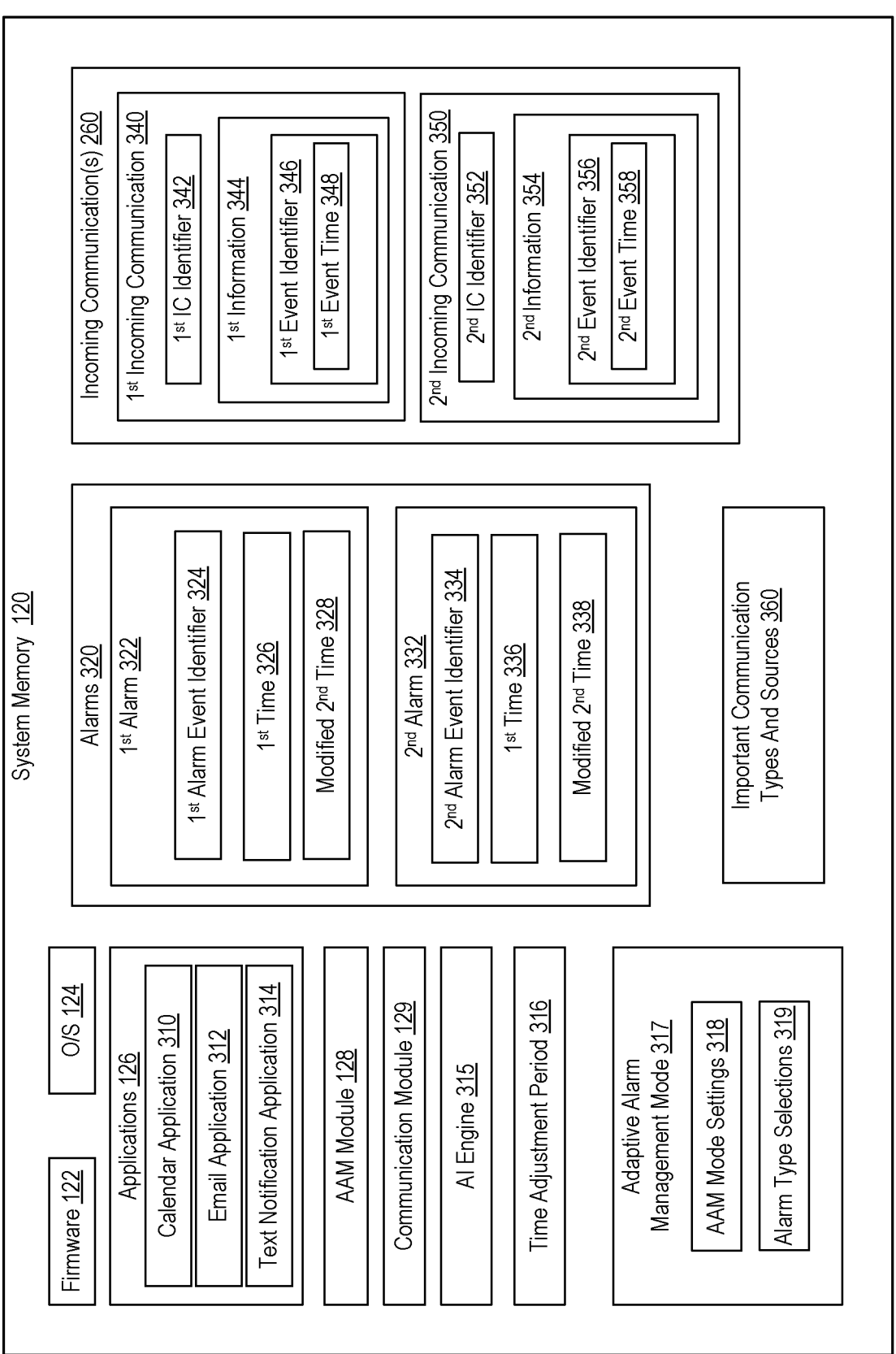
FIG. 3 is a block diagram of example contents of the system memory of the example electronic device of FIG. 1 configured to complete the various processes described herein, according to one or more embodiments.

Referring to FIG. 3, there is shown one embodiment of example contents of system memory 120 of electronic device 100 configured to complete the various processes described herein. System memory 120 includes data, software, and/or firmware modules, including firmware 122, an operating system (O/S) 124, applications 126, adaptive alarm management (AAM) module 128, and communication module 129.

Applications 126 include a calendar application 310, an email application 312, and a text message notification application 314. Calendar application 310 includes program code that is executed by processor 102 to enable electronic device 100 to maintain a digital calendar of planned or scheduled events on specific days and times. The digital calendar can include a user interface by which a user is able to enter their own scheduled events. Also, in one or more embodiments, the digital calendar can be set to automatically schedule a tracked event based on receiving an invitation from another user/device, such as an invitation to a meeting event. Email application 312 includes program code that is executed by processor 102 to enable electronic device 100 to send and receive electronic mail (email) communications to and from other electronic devices and external computer systems. Text message notification application 314 includes program code that is executed by processor 102 to enable electronic device 100 to send and receive text message communications to and from other electronic devices and external computer systems. In one embodiment, calendar application 310, email application 312, and text message notification application 314 can enable electronic device 100 to receive information 217, 237 that can be used to change or update an alarm setting of electronic device 100.

AAM module 128 includes program code that is executed by processor 102 to enable electronic device 100 to perform the various features of the present disclosure. In one or more embodiments, AAM module 128 enables electronic device 100 to manage at least one alarm of the electronic device. In one or more embodiments, execution of AAM module 128 by processor 102 enables/configures electronic device 100 to perform the processes presented in the flowcharts of FIGS. 7-9, as will be described below. Communication module 129 enables electronic device 100 to communicate and exchange data with wireless network 150 and/or WiFi router 196 and with other devices.

System memory 120 includes artificial intelligence (AI) engine 315 and adaptive alarm management (AAM) mode 317. AI engine 315 accelerates artificial intelligence, natural language processing (NLP), context evaluation (CE), and machine learning applications. AI engine 315 enables electronic device 100 to analyze or parse incoming communication(s) 260 and identify if incoming communication(s) 260 contains information that warrants performing an alarm modification or an alarm modifying message. AI engine 315 further enables electronic device 100 to identify at least one event time contained in the information that would warrant making a change in a time of a scheduled alarm or cancelling the alarm altogether. AI engine 315 enables electronic device 100 to perform context evaluation of incoming communications to determine the context of the incoming communications. In one embodiment, AI engine 315 can compare text of the incoming communications to known databases of information, such as a context database to determine the context of incoming communications. AI engine 315 and/or hardware-based AI engine 103 can perform/support the same operations.

AAM mode 317 is a mode of operation for electronic device 100 to manage at least one alarm of the electronic device. AAM mode 317, when selected, enables change of an original or initial alarm time to a modified alarm time, based on information that warrants performing an alarm modification. The information is contained in an incoming communication from an external source. AAM mode 317 includes AAM mode settings 318 and alarm type selections 319. AAM mode settings 318 include one or more user selectable options for use during the operation of AAM mode 317. In an example embodiment, AAM mode settings 318 can include a user selectable option to allow the at least one incoming communication that contained the information warranting an alarm modification to be used for subsequent modifications to other similar original alarm times. In another example embodiment, AAM mode settings 318 can include an option that only allows modification of an original alarm time to a time that is later than or after the original alarm time. In yet another example embodiment, AAM mode settings 318 can include an option that only allows modification of an original alarm time to a time that is earlier than or before the original alarm time. Alarm type selections 319 include the different types of alarms that can be selected for use with AAM mode 317. In an example embodiment, a meeting alarm type can be selected for use with AAM mode 317, while a wake-up alarm can be selected to be prohibited for use with AAM mode 317.

System memory 120 includes time adjustment period 316. Time adjustment period 316 is an amount of time that an original alarm time is adjusted or changed by to generate a new alarm time. In one embodiment, time adjustment period 316 is determined based on the information warranting an alarm modification contained in an incoming communication received by electronic device 100. In one or more embodiments, time adjustment period 316 is determined by AI processing.

System memory 120 further includes alarms 320 that can be set to be activated or triggered at pre-determined times. Activation of the alarm can include various alerts to the alarm, such as an audible alert (i.e., alarm tone) via speaker 144, and/or a visible alert via display 130, and/or a vibrating alert via vibration device 146. Alarms 320 include a first alarm 322 and a second alarm 332. While two alarms are shown, alarms 320 can include more than two alarms. First alarm 322 includes first alarm event identifier 324, first time 326, and a modified second time 328. First alarm event identifier 324 is the alarm name or alarm event associated with stored contextual information of first alarm 322. First time 326 is the original time that first alarm 322 is set to be activated. In one embodiment, first time 326 can be set by a user of electronic device 100, via, e.g., touch screen interface 131. Modified second time 328 is the time that first alarm 322 is set to be activated after having been adjusted or modified by the time adjustment period 316. Modified second time 328 can be before or after first time 326.

Second alarm 332 includes a second alarm event identifier 334, first time 336, and a modified second time 338. Second alarm event identifier 334 is the alarm name or alarm event associated with stored contextual information of second alarm 332. First time 336 is the original time that second alarm 332 is set to be activated. In one embodiment, first time 336 can be set by a user of electronic device 100, via, e.g., touch screen interface 131. Modified second time 338 is the time that second alarm 332 is set to be activated after having been adjusted or modified by the time adjustment period 316. Modified second time 338 can be before or after first time 336.

System memory 120 includes incoming communications 260. Electronic device 100 can receive incoming communication(s) 260 from an external source, such as external computer system 180 or second electronic device 182. The incoming communication(s) 260 can correspond to at least one of outgoing communications 212 and 232. Incoming communications 260 include first incoming communication 340 and second incoming communication 350.

First incoming communication 340 can include first incoming communication (IC) identifier 342 and first information 344. In one embodiment, electronic device 100 can identify that first information 344 contains alarm changing information or information that warrants performing an alarm modification, which is used to modify the alarm time of at least one alarm. First information 344 can include first event identifier 346 and first event time 348. First event identifier 346 is data that identifies an event associated with the incoming communication. First event time 348 is a time associated with the first event identifier 346. In an example embodiment, first information 344 can be an e-mail that moves a scheduled meeting from an original time (e.g., 1:00 PM) to the first event time 348 (e.g., 2:00 PM).

Second incoming communication 350 can include second incoming communication (IC) identifier 352 and second information 354. In one embodiment, electronic device 100 can identify that second information 354 contains alarm changing information or information that warrants performing an alarm modification, which is used to modify the alarm time of at least one alarm. Second information 354 can include second event identifier 356 and second event time 358. Second event identifier 356 is data that identifies an event associated with the incoming communication. Second event time 358 is a time associated with the second event identifier 356. In an example embodiment, second information 354 can be a text message that moves a carpool pickup time from an original time (e.g., 7:00 AM) to second event time 358 (e.g., 7:30 AM).

In one embodiment, electronic device 100 can determine time adjustment period 316 based on an original alarm time (e.g., first time 326) and an event time (e.g., first event time 348) identified within information that warrants performing an alarm modification (e.g., first information 344) contained in an incoming communication (e.g., first incoming communication 340) received by electronic device 100.

System memory 120 further includes important communication types and sources 360. Important communication types and sources 360 are trusted communication types and sources that are recognized/approved (e.g., from a high priority contact and/or a type of communication that is pre-identified as being an important communication) that can contain an incoming communication with information that warrants performing an alarm modification. In one embodiment, electronic device 100 can determine the type/source of an incoming communication (e.g., first IC identifier 342) and determine if the type/source of an incoming communication is substantially similar to or matches an entry in important communication types and sources 360. In response to determining that first IC identifier 342 is substantially similar to or matches an entry in important communication types and sources 360, (i.e., the incoming communication is one of the pre-approved set of important communications), electronic device 100 performs the adjustment of the first alarm time to the modified second alarm time.

Figure 4B:
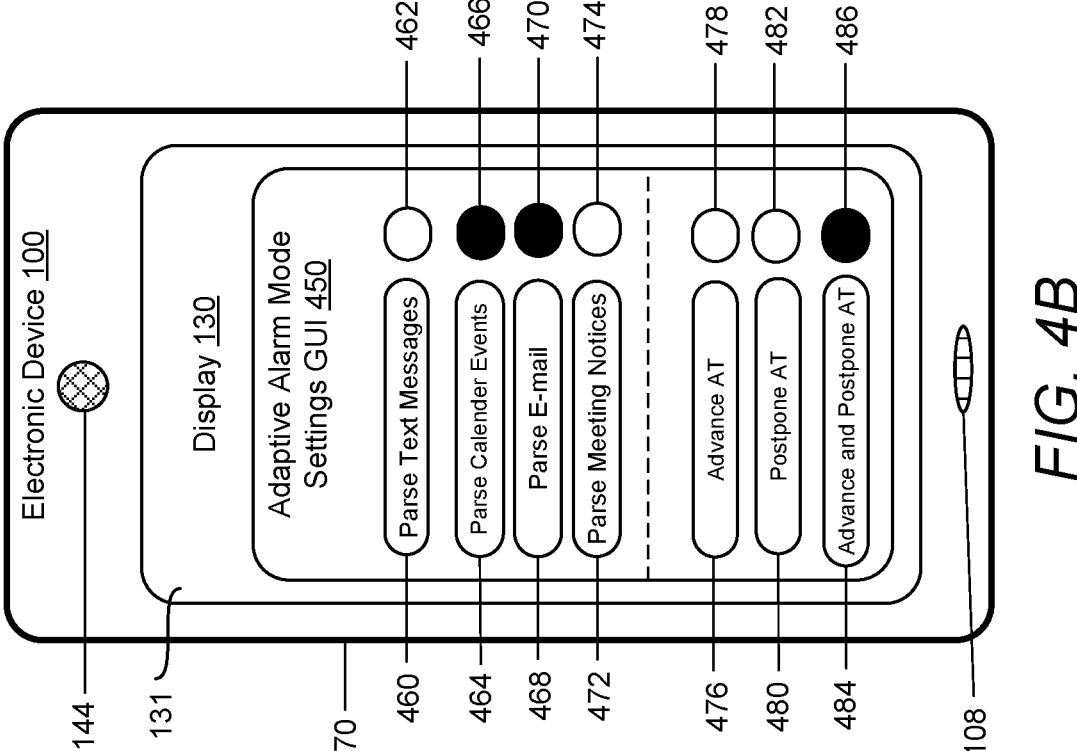
FIG. 4B is an example illustration of a graphical user interface (GUI) presented on a display of an electronic device that includes selectable settings for the AAM mode option, according to one or more embodiments.
Figure 4A:
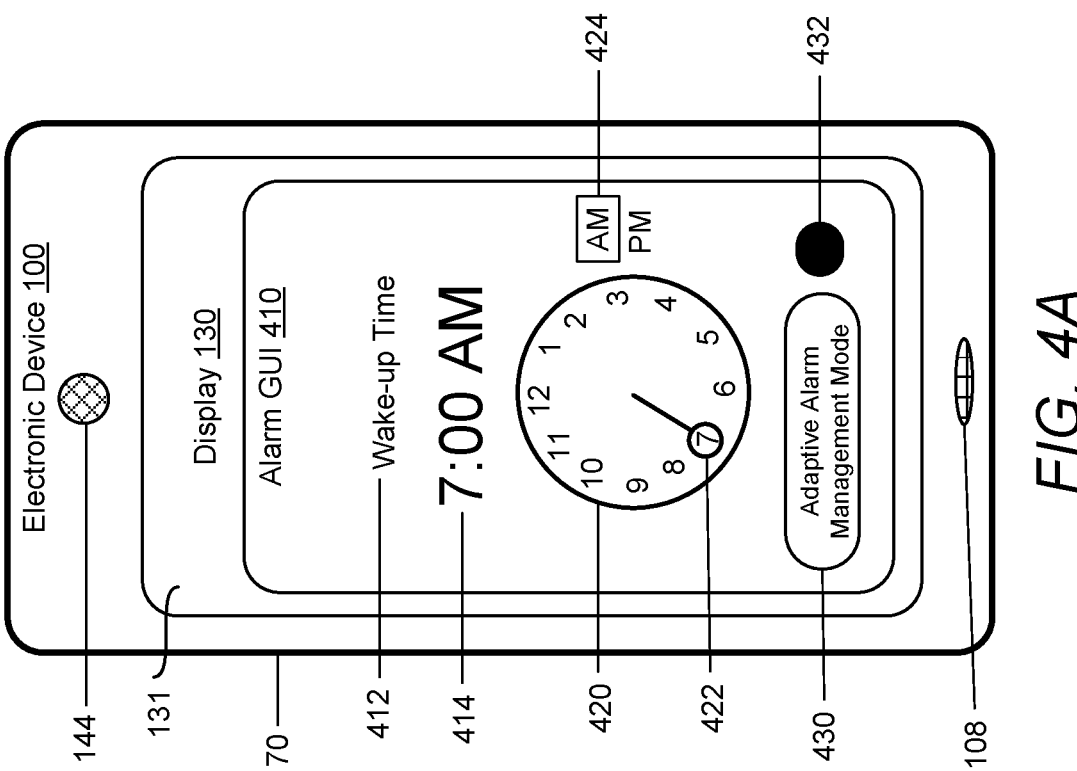
FIG. 4A is an example illustration of a graphical user interface (GUI) presented on a display of an electronic device that includes a selectable adaptive alarm management (AAM) mode option, according to one or more embodiments.

With reference to FIG. 4A, electronic device 100 is shown with an example alarm graphical user interface (GUI) 410 presented on display 130. Alarm GUI 410 allows a user of electronic device 100 to set-up and select various options for the operation of one or more alarms of electronic device 100. In one embodiment, alarm GUI 410 is shown after a user has selected an option to set one or more alarms of electronic device 100. Alarm GUI 410 includes a clock 420. Clock 420 has the hour numbers of a clock (i.e., 1-12) and a moveable indicator circle 422. A user can move indicator circle 422 on clock 420, using touch screen interface 131, to a desired alarm time 414. As the indicator circle 422 is moved, the AM/PM indicator rectangle 424 can shift between AM and PM, depending upon the position of indicator circle 422. Alarm GUI 410 includes alarm event identifier 412 and an alarm time 414. In FIG. 4A, alarm event identifier 412 is shown as "Wake-up Time" and alarm time 414 is shown as 7:00 AM. In one embodiment, alarm event identifier 412 can correspond to first alarm event identifier 324 or second alarm event identifier 334.

Alarm GUI 410 further includes a selectable adaptive alarm management (AAM) mode option 430 and option on/off indication 432. AAM mode option 430, when selected, enables operation of alarms of electronic device 100 in AAM mode 317, where one or more alarms can be modified or adjusted based on incoming communications to electronic device 100. Option on/off indication 432 is filled in or checked when the AAM mode option 430 is selected.

With reference to FIG. 4B, electronic device 100 is shown with an example AAM mode settings GUI 450 presented on display 130. AAM mode settings GUI 450 allows a user of electronic device 100 to set-up and select various options of AAM mode settings 318, which are used during the operation of AAM mode 317. AAM mode settings GUI 450 includes parse text messages option 460, with option on/off indication 462, parse calendar events option 464, with option on/off indication 466, parse e-mail option 468, with option on/off indication 470, and parse meeting notices option 472, with option on/off indication 474.

Parse text messages option 460, when selected, enables incoming communications 260 that contain a text message to be analyzed/parsed by AI engine 315 to determine if the text message contains information warranting an alarm modification. Option on/off indication 462 is filled in or checked when parse text messages option 460 is selected. Parse calendar events option 464, when selected, enables incoming communications 260 that contain a calendar event, to be analyzed/parsed by AI engine 315 to determine if the calendar event contains information warranting an alarm modification. Option on/off indication 466 is filled in or checked when parse calendar events option 464 is selected.

The selection of parse e-mail option 468 enables incoming communications 260 that contain an e-mail, to be analyzed/parsed by AI engine 315 to determine if the e-mail contains information warranting an alarm modification. Option on/off indication 470 is filled in or checked when parse e-mail option 468 is selected. The selection of parse meeting notices option 472 enables incoming communications 260 that contain a meeting notice, to be analyzed/parsed by AI engine 315 to determine if the meeting notice contains information warranting an alarm modification. Option on/off indication 474 is filled in or checked when parse meeting notices option 472 is selected.

AAM mode settings GUI 450 further includes selectable options to allow advancing, postponing, or both advancing and postponing of original or initial alarm times. AAM mode settings GUI 450 includes advance alarm time (AT) option 476, with option on/off indication 478, postpone AT option 480, with option on/off indication 482, advance and postpone AT option 484, with option on/off indication 486.

Advance alarm time (AT) option 476, when selected, enables dynamic modification of the first time 326 of the first alarm 322 to a time that is before the first time. Option on/off indication 478 is filled in or checked when advance AT option 476 is selected. Postpone AT option 480, when selected, enables dynamic modification of the first time 326 of the first alarm 322 to a time that is after the first time. Option on/off indication 482 is filled in or checked when postpone AT option 480 is selected. Advance and postpone AT option 484, when selected, enables dynamic modification of the first time 326 of the first alarm 322 to a time that is either before or after the first time. Option on/off indication 486 is filled in or checked when advance and postpone AT option 484 is selected.

FIG. 5 illustrates a table 500 of example embodiments of incoming communications 260 and corresponding alarm adjustments based on information contained in the incoming communications that warrant an alarm modification. Table 500 includes incoming communications 260, alarm event identifier (ID) 510, original alarm time 520, time adjustment period 316, and adjusted alarm time 530.

In a first example 502, incoming communications 260 can be a calendar event e-mail that a 7:30 AM meeting has been rescheduled to 8:30 AM. A user can have a first alarm 322 set to an original alarm time of 7:00 AM to wake from sleeping. Electronic device 100 can parse the incoming communications 260, using AI engine 103/315, to retrieve identifying data (e.g., first information 344) corresponding to first alarm 322. The identifying data can include a first event identifier (ID) 346 that substantially matches an alarm event identifier 510, (e.g., first alarm event ID 324) associated with stored contextual information of the first alarm 322. In the first example 502, the alarm event identifier is the first alarm event ID 324, "Wake-up Time". Electronic device 100 can identify that the incoming communication contains first information 344 that warrants performing an alarm modification to the first alarm 322.

In response to identifying that the incoming communication contains first information 344 that warrants performing an alarm modification to the first alarm 322, electronic device 100 identifies a first event time 348 within first information 344. Electronic device 100 determines time adjustment period 316 based on the original alarm time (e.g., first time 326) and the first event time 348. Electronic device 100 adjusts the original alarm time (e.g., first time 326), by the time adjustment period 316, to generate an adjusted alarm time (e.g., modified second time 328) and updates the first alarm 322 to be triggered at the adjusted alarm time. In the first example 502, the incoming e-mail communication warranted a change or modification from the original alarm time of 7:00 AM to the adjusted alarm time of 8:00 AM. In the first example 502, the adjusted alarm time was postponed to a later time from the original alarm time.

In a second example 504, incoming communications 260 can be a text message that a child's school is dismissing students early today at 2:30 PM. A user can have a second alarm 332 set to an original alarm time of 2:30 PM to remind them to leave to pick-up their child from school. Electronic device 100 can parse the incoming communications 260, using AI engine 103/315, to retrieve identifying data (e.g., second information 354) corresponding to second alarm 332. The identifying data can include a second event identifier (ID) 356 that substantially matches an alarm event identifier 510, (e.g., second alarm event ID 334) associated with stored contextual information of the second alarm 332. In the second example 504, the alarm event identifier is the second alarm event ID 334, "School Pick-up Time". Electronic device 100 can identify that the incoming communication contains second information 354 that warrants performing an alarm modification to the second alarm 332.

In response to identifying that the incoming communication contains second information 354 that warrants performing an alarm modification to the second alarm 332, electronic device 100 identifies a second event time 358 within second information 354. Electronic device 100 determines time adjustment period 316 based on the original alarm time (e.g., first time 336) and the second event time 358. Electronic device 100 adjusts the original alarm time (e.g., first time 336), by the time adjustment period 316, to generate an adjusted alarm time (e.g., modified second time 338) and updates the second alarm 332 to be triggered at the adjusted alarm time. In the second example 504, the incoming text message warranted a change or modification from the original alarm time of 2:30 PM to the adjusted alarm time of 2:00 PM. In the second example 504, the adjusted alarm time was advanced to an earlier time from the original alarm time.

Electronic device 100 can automatically advance or postpone the time that one or more alarms are set to be triggered, based on information contained in incoming communications 260. In one embodiment, first alarm 322 or second alarm 332 can be canceled based on information contained in incoming communications 260.

Figure 6B:
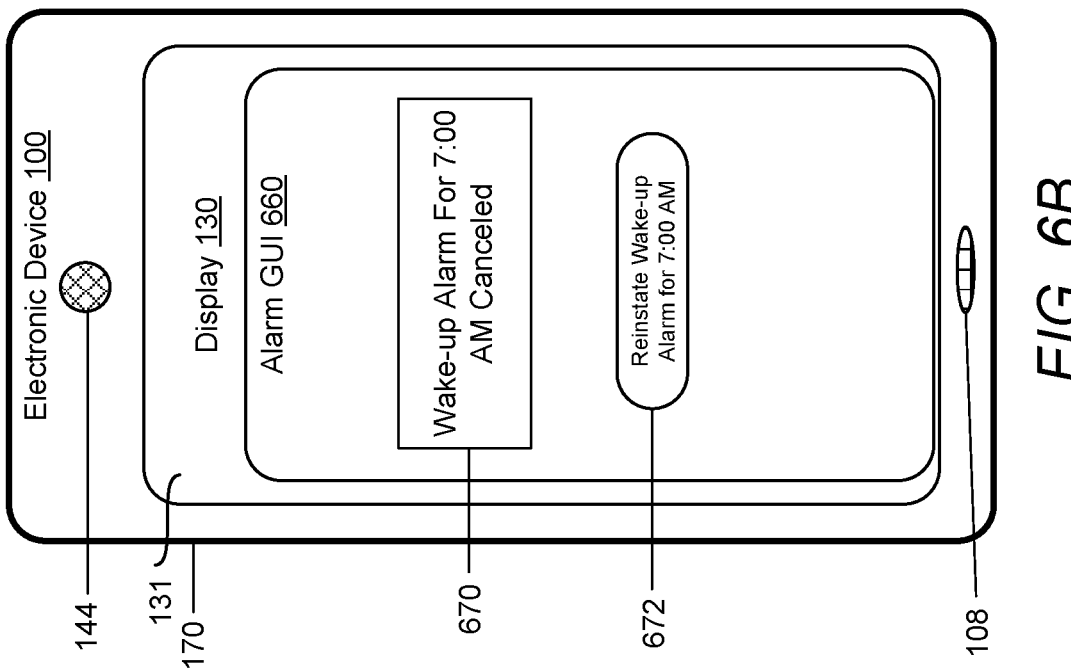
FIG. 6B is an example illustration of a graphical user interface (GUI) presented on a display of an electronic device after an alarm has been suspended or canceled based on an incoming communication, according to one or more embodiments.
Figure 6A:
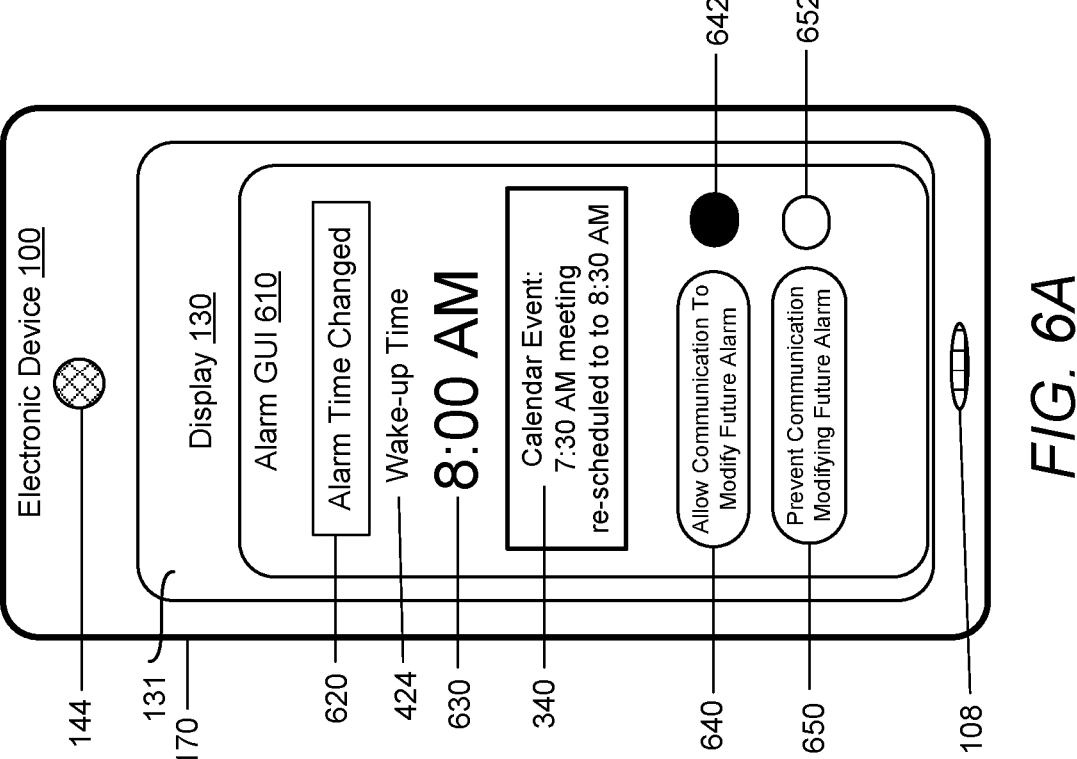
FIG. 6A is an example illustration of a graphical user interface (GUI) presented on a display of an electronic device after the alarm time been adjusted based on an incoming communication, according to one or more embodiments.

Turning to FIG. 6A, electronic device 100 is shown with an example alarm graphical user interface (GUI) 610 presented on display 130 after the alarm time been adjusted based on an incoming communication. Alarm GUI 610 corresponds to the first example 502 of FIG. 5 of a wake-up time of an alarm being modified. Alarm GUI 610 includes a notification 620 that the first time 324 of the first alarm 322 was changed to the modified second time 328. In the embodiment of FIG. 6A, the incoming e-mail communication included information that triggered/caused a change or modification from the original alarm time of 7:00 AM to the adjusted alarm time of 8:00 AM. Alarm GUI 610 shows the alarm time 630 adjusted to 8:00 AM.

Alarm GUI 610 further includes the incoming communication (e.g., first incoming communication 340) that contained the information (e.g., first information 344) that caused/triggered the alarm modification. In one embodiment, alarm GUI 610 is presented after electronic device 100 detects a wake-up event of the electronic device from a sleep mode.

Alarm GUI 610 includes respective user selectable options 640 and 650 to allow or prevent future occurrences of the incoming communication containing similar information that triggered/caused the alarm modification to be used for subsequent modifications to the first alarm. Alarm GUI 610 allows incoming communications to modify future alarm option 640, with option on/off indication 642, and prevent incoming communications to modify future alarm option 650, with option on/off indication 652.

Allow incoming communication to modify future alarm option 640, when selected, enables the incoming communication (e.g., incoming communication 340) that contained the information (e.g., information 344) that warranted performing the alarm modification to be used for subsequent future modifications to the first time of the first alarm. Option on/off indication 642 is filled in or checked when allow incoming communication to modify future alarm option 640 is selected.

The selection of prevent incoming communication from modifying future alarm option 650 prevents the incoming communication (e.g., incoming communication 340) that contained the information (e.g., information 344) that warranted performing the alarm modification from being used for subsequent future modifications to the first time of the first alarm. Option on/off indication 652 is filled in or checked when prevent incoming communication to modify future alarm option 650 is selected. The selection of prevent incoming communication from modifying future alarm option 650 prevents subsequently-received incoming communications that contain similar information from being used to trigger subsequent modifications to subsequent corresponding (i.e., first) alarms. According to one aspect of the disclosure, in response to receiving a subsequently-received incoming communication having similar information, while a subsequent first alarm 322 is scheduled and the prevent incoming communication to modify future alarm option 650 is activated, electronic device 100 prevents the subsequently-received incoming communication from triggering any modification to the subsequent first alarm 322.

Turning to FIG. 6B, electronic device 100 is shown with an example alarm graphical user interface (GUI) 660 presented on display 130 after an alarm (e.g. first alarm 322) has been suspended or canceled based on an incoming communication. Alarm GUI 660 includes a notification 670 that the first time 324 of the first alarm 322 was canceled. Alarm GUI 610 further includes a selectable option 672 to override the suspension and reinstate the first alarm 322. In one embodiment, in response to the received information (e.g., first information 344) being a cancellation of an event (e.g., first event ID 346) electronic device 100 suspends scheduling of the first alarm 322 and generates and outputs a notification 670 that the first alarm has been canceled. The notification includes a selectable option 672 to override the suspension and reinstate the first alarm.

According to one aspect of the disclosure, electronic device 100 can detect activation of a first alarm 322 that is set to trigger at a first time 326 and monitor for receipt of incoming communications 260 that are not attended to by a user of the electronic device. Electronic device 100 can identify that a first incoming communication 340 contains at least one information (e.g. first information 344) having specific detail that causes/triggers an alarm modification of the first alarm. In response to identifying that the incoming communication contains the at least one information, electronic device 100 determines a time adjustment period 316 based on the at least one information. Electronic device 100 adjusts the first time 326, by the time adjustment period 316 to generate a modified second time 328 and updates the first alarm 322 to be triggered at the modified second time 328.

According to another aspect of the disclosure, to identify that the incoming first communication 340 contains information (e.g., first information 344) that warrants performing an alarm modification, electronic device 100 processes the incoming communication 340 through an artificial intelligence engine 103/315, which parses the at least one incoming communication to retrieve identifying data (i.e., first event identifier 346) corresponding to the first alarm 322. The identifying data includes at least one of: (i) a first event identifier 346 that substantially matches a referenced first alarm event identifier 324 that is associated with stored contextual information of the first alarm 322; (ii) a second event identifier 356 and information corresponding to a second alarm event identifier 334 that is scheduled to occur at a second event time and which requires an earlier triggering of the second alarm 332 to alert/inform the user about the second event before a scheduled time of the second event; and (iii) alarm modifying information (e.g., information 344) that alters or modifies at least one scheduling aspect corresponding to a first event that is initially scheduled for after the first alarm 322. The alarm modifying information includes at least one of: (a) cancelation of the first event; (b) a first event time being moved to a later time than originally scheduled, relative to the first time of the first alarm and (c) the first event time being moved to an earlier time.

According to an additional aspect of the disclosure, the time adjustment period 316 is determined based on a corresponding one of (i) the first or the second event time and (ii) the first time of the first alarm and (iii) heuristically determined or user established adjustment times, based on a type of an event. In one or more embodiments, the time adjustment period 316 is determined by AI evaluation of the received information relative to the previously scheduled time of the alarm. In one or more embodiments, AI engine 103/315 can determine that an adjustment may not be sufficient to cause a change in the originally scheduled alarm time (e.g. first time 326). As an example, if a time of a scheduled Zoom meeting is changed from 3:00 PM to 3:15 PM or 2:45 PM, the AI engine 103/315 may determine that the 15-minute difference does not warrant a change in the user's scheduled 2:30 PM alarm, as the meeting is occurring online on the user's electronic device. However, in the example of a school ending 15 minutes earlier, the AI engine would reset the alarm to 15 minutes earlier taking into consideration the parent's commute time to the school.

According to one more aspect of the disclosure, electronic device 100 can determine whether an incoming communication 260 is one of a pre-approved set of important communications (i.e., one of important communication types and sources 360) from among communications received from at least one of (i) a high priority contact and (ii) a type of communication that is pre-identified as being an important communication. In response to determining that the incoming communication 260 is one of the pre-approved set of important communications, electronic device 100 performs the adjustment of the first time 326 of the first alarm to the modified second time 328. In one example embodiment, a high priority contact can be an e-mail from a manager or a text message from a spouse or child. In another example embodiment, a type of communication that is pre-identified as being an important communication can be an e-mail from a known work e-mail address or from known calendaring websites (e.g., evite.com, zoom.com).

Figure 7:
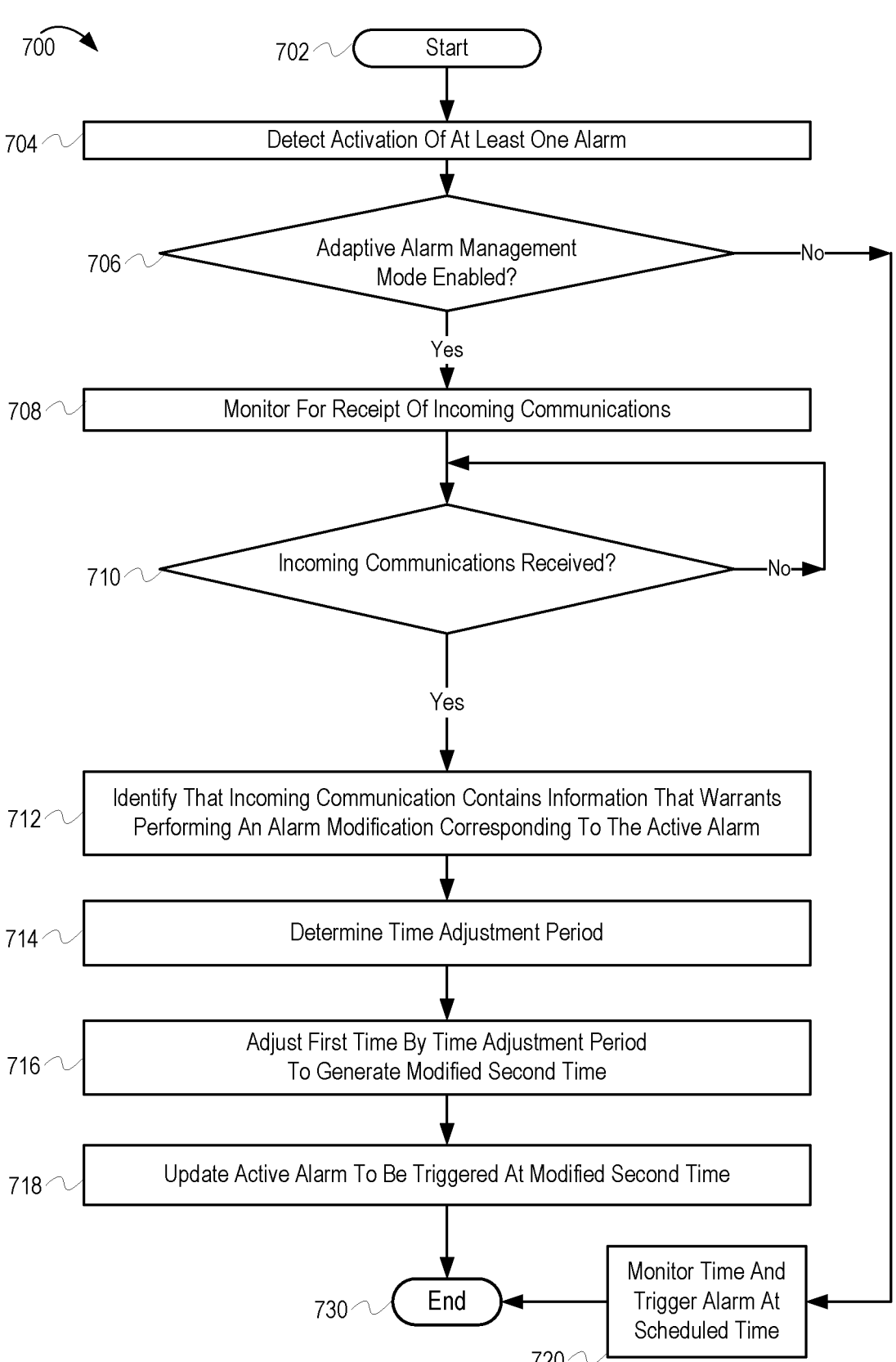
FIG. 7 depicts a flowchart of a method by which an electronic device manages at least one alarm of the electronic device, according to one or more embodiments.
Figure 8:
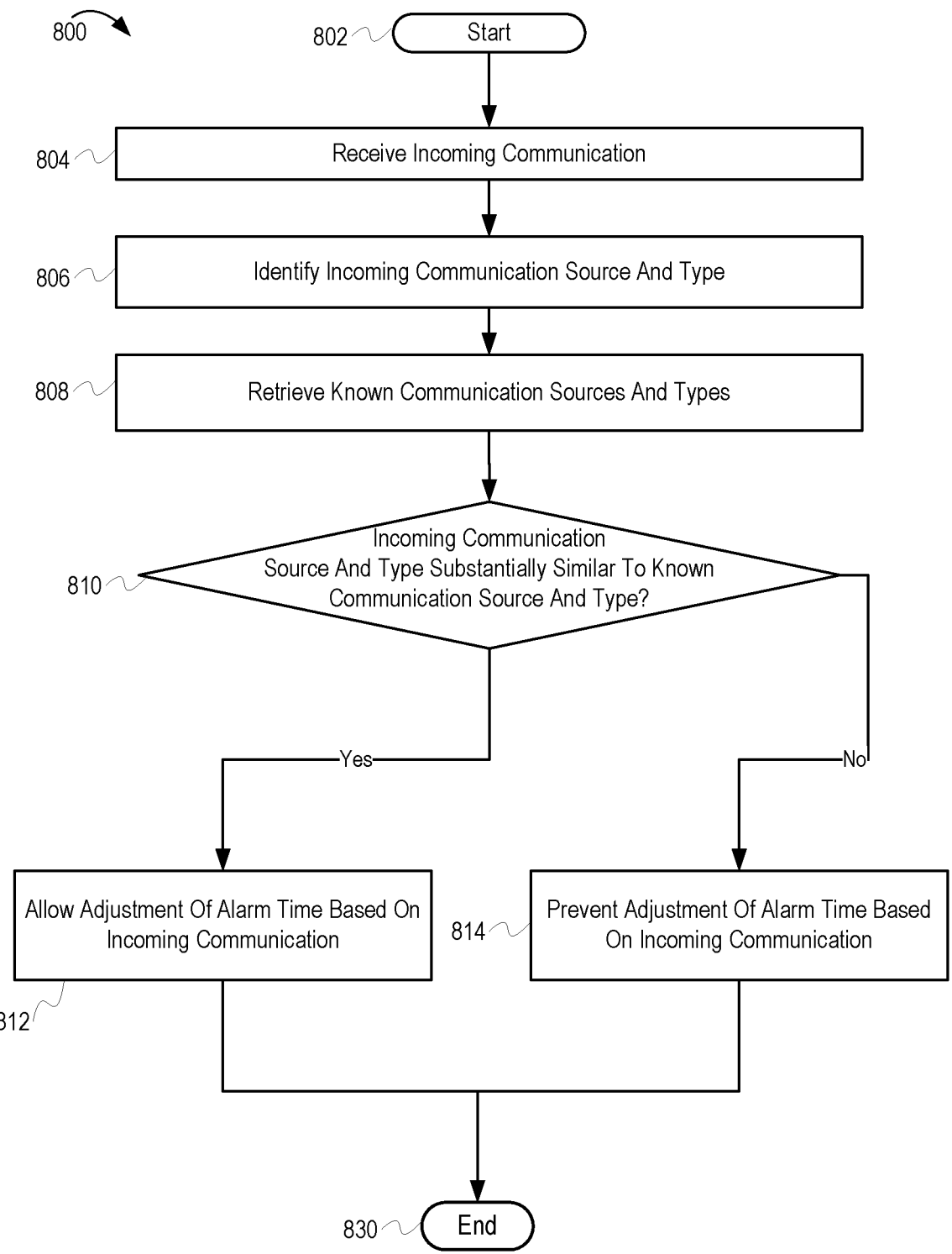
FIG. 8 depicts a flowchart of a method by which an electronic device determines if an incoming communication is part of a known source or type of communication that is allowed to be used in time adjustments to an alarm of the electronic device, according to one or more embodiments.
Figure 9:
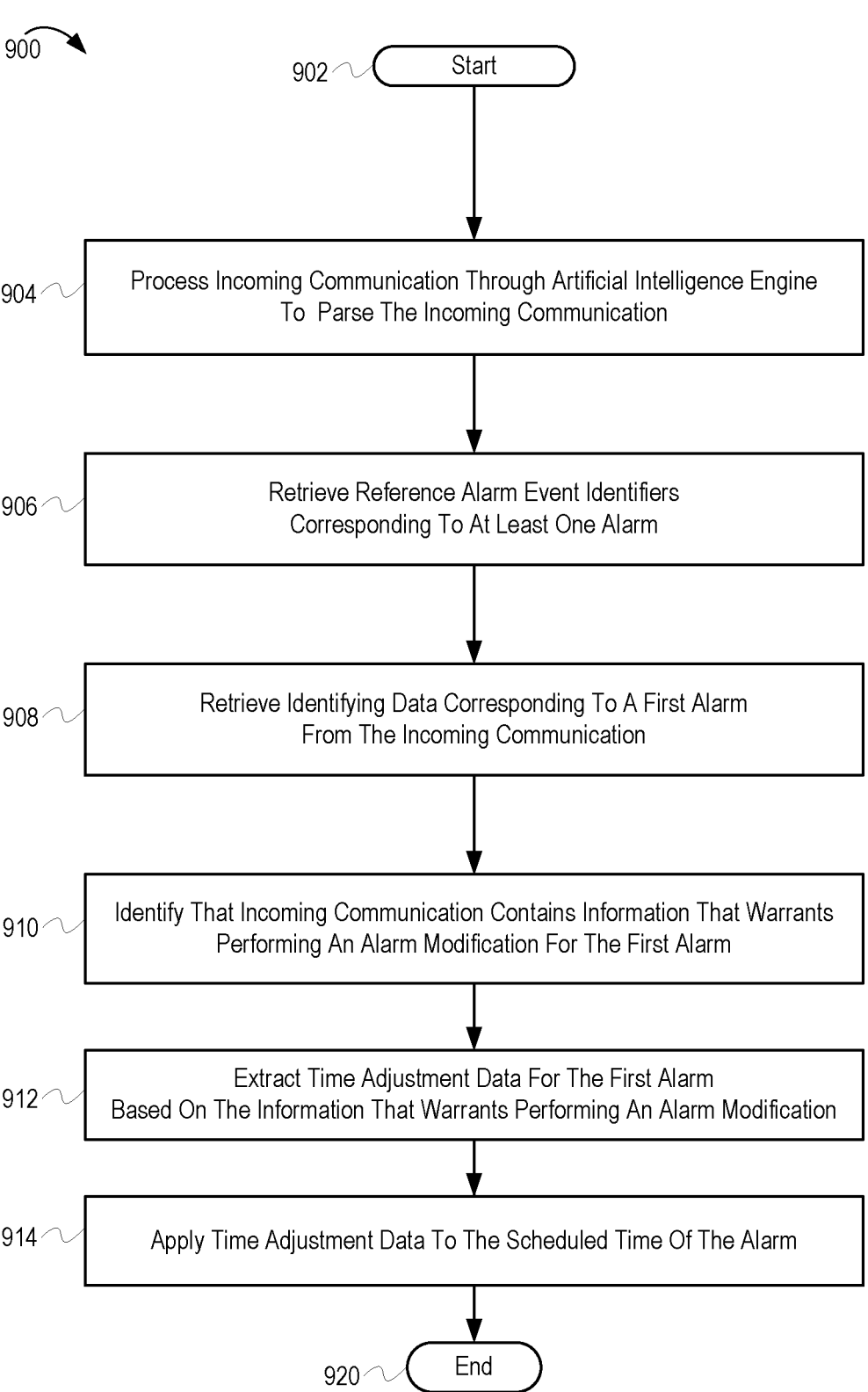
FIG. 9 depicts a flowchart of a method by which an electronic device processes incoming communications through an artificial intelligence (AI) engine to identify an alarm modifying communication, according to one or more embodiments.

FIG. 7 depicts method 700 by which electronic device 100 manages at least one alarm of the electronic device. FIG. 8 depicts method 800 by which electronic device 100 determines if an incoming communication is part of a known source or type of communication that is allowed to be used to trigger/cause time adjustments to an alarm of the electronic device. FIG. 9 depicts method 900 by which electronic device 100 parses an incoming communication using an artificial intelligence engine in determining whether and/or how to modify an established alarm. The description of methods 700, 800 and 900 will be described with reference to the components and examples of FIGS. 1-6B. The operations depicted in FIGS. 7-9 can be performed by electronic device 100 or any suitable electronic device that includes the one or more functional components of electronic device 100 that provide/enable the described features. One or more of the processes of the methods described in FIGS. 7-9 may be performed by processor 102 executing program code associated with AAM module 128.

With specific reference to FIG. 7 method 700 begins at the start block 702. At block 704, method 700 includes detecting activation of at least one alarm (e.g., first alarm 322) that is set to trigger at a first time 326. Method 700 includes determining if adaptive alarm management mode 430 is enabled (decision block 706). In response to determining that adaptive alarm management mode 430 is not enabled, method 700 includes monitoring the current time and triggering the alarm (e.g., first alarm 322) at the original scheduled time (e.g., first time 326) (block 720). Method 700 then terminates at end block 730. In response to determining that adaptive alarm management mode 430 is enabled, method 700 includes monitoring for receipt of incoming communications 260 that are not attended to by a user of the electronic device (block 708).

Method 700 further includes determining if incoming communications 260 that are not attended to by a user have been received (decision block 710). In response to determining that incoming communications 260 that are not attended to by a user have not been received, method 700 returns to decision block 710 to continue determining if incoming communications 260 that are not attended to by a user have been received. In response to determining that incoming communications 260 that are not attended to by a user have been received, method 700 further includes identifying that the incoming communications (e.g., first incoming communication 340) contains at least one information (e.g. first information 344) that warrants performing an alarm modification corresponding to the active first alarm 322 (block 712).

In response to identifying that the incoming communication contains the at least one information that warrants performing an alarm modification corresponding to the active first alarm 322, method 700 includes determining a time adjustment period 316 based on the at least one information (e.g. first information 344) and a type of alarm event that was initially scheduled (block 714). Method 700 includes adjusting the first time 326 by the time adjustment period 316 to generate modified second time 328 (block 716) and updating the first alarm 322 to be triggered at the modified second time 328 (block 718). Method 700 terminates at end block 730.

FIG. 8 illustrates method 800 by which electronic device 100 determines if an incoming communication is part of a known source or type of communication that is allowed to be used in triggering time adjustments to an alarm of the electronic device. With specific reference to FIG. 8, method 800 begins at the start block 802. Method 800 includes receiving at least one incoming communication 260 (e.g., first incoming communication 340) (block 804) and identifying a source (e.g., first IC identifier 342) and type of the incoming communication (block 806). In one embodiment, the type of incoming communication can be identified from at least one of first information 344 or first event identifier 346. Method 800 includes retrieving known communication sources and types 360 from system memory 120 (block 808). In one or more embodiments, known communication sources and types 360 can be at least one of (i) a high priority contact and (ii) a type of communication that is pre-identified as being an important communication. The type of communication can be a communication originating from a work email address or work phone number, a school message board phone/messaging/email identifier, a calendar update, etc.

At decision block 810, method 800 includes determining if the source and/or type of the first incoming communication 340 is substantially similar to at least one of known communication sources and types 360. In response to determining that the source and/or type of the first incoming communication 340 is substantially similar to at least one of known communication sources and/or types 360, method 800 includes allowing adjustment of the first time 326 of the first alarm to the modified second time 328 based on information from the first incoming communication (block 812). Method 800 ends at end block 830.

In response to determining that the source and/or type of the first incoming communication 340 is not substantially similar to at least one of known communication sources and/or types 360, method 800 includes ignoring the first incoming communication and/or preventing adjustment of the first time 326 of the first alarm to the modified second time 328 based on the first incoming communication (block 814). Method 800 terminates at end block 830.

FIG. 9 illustrates method 900 by which electronic device 100 parses an incoming communication to identify that the incoming communication contains at least one information that warrants performing an alarm modification. With specific reference to FIG. 9, method 900 begins at the start block 902. At block 904, method 900 includes processing the incoming communication (e.g. first incoming communication 340) through artificial intelligence engine 103/315 to parse information contained within and associated with the at least one incoming communication, including the message header, etc. Method 900 includes retrieving reference alarm event identifier(s) (e.g., first alarm event identifier 324) associated with stored contextual information of at least one alarm (e.g., first alarm 322) from system memory 120 (block 906).

Method 900 includes retrieving identifying data corresponding to the first alarm, (e.g., first alarm 322) from the incoming communication (e.g., first incoming communication 340) (block 908). The identifying data can include at least one of (i) a first event identifier 346 that substantially matches a referenced first alarm event identifier 324 associated with stored contextual information of the first alarm 322, (ii) a second event identifier 356 and information corresponding to a second alarm event identifier 334 that is scheduled to occur at a second event time and which requires an earlier triggering of the second alarm 332 to enable the user to be alerted/informed about the second event before a scheduled time of the second event, and (iii) alarm modifying information (e.g., first information 344) that alters or modifies at least one scheduling aspect corresponding to a first event that is initially scheduled for after the first alarm 322. The alarm modifying information includes at least one of: (a) cancelation of the first event; (b) a first event time being moved to a later time than originally scheduled, relative to the first time of the first alarm and (c) the first event time being moved to an earlier time.

Method 900 includes identifying that the incoming communication (e.g. first incoming communication 340) contains at least one information (e.g., first information 344) that warrants performing an alarm modification corresponding to the alarm (e.g., first alarm 322) (block 910). Method 900 includes extracting time adjustment data (e.g., time adjustment period 316) from the information (e.g., first information 344) (block 912). Method 900 then includes applying the time adjustment data to the scheduled time of the alarm (block 914). Method 900 terminates at end block 920.

In the above-described methods of FIGS. 7-9, one or more of the method processes may be embodied in a computer readable device containing computer readable code such that operations are performed when the computer readable code is executed on a computing device. In some implementations, certain operations of the methods may be combined, performed simultaneously, in a different order, or omitted, without deviating from the scope of the disclosure. Further, additional operations may be performed, including operations described in other methods. Thus, while the method operations are described and illustrated in a particular sequence, use of a specific sequence or operations is not meant to imply any limitations on the disclosure. Changes may be made with regards to the sequence of operations without departing from the spirit or scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object-oriented programming language, without limitation. These computer program instructions may be provided to a processor of a general-purpose computer, special-purpose computer, or other programmable data processing apparatus to produce a machine that performs the method for implementing the functions/acts specified in the flowchart and/or block diagram block or blocks. The methods are implemented when the instructions are executed via the processor of the computer or other programmable data processing apparatus.

As will be further appreciated, the processes in embodiments of the present disclosure may be implemented using any combination of software, firmware, or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible medium that can contain or store a program for use by or in connection with an instruction execution system, apparatus, or device.

Where utilized herein, the terms "tangible" and "non-transitory" are intended to describe a computer-readable storage medium (or "memory") excluding propagating electromagnetic signals; but are not intended to otherwise limit the type of physical computer-readable storage device that is encompassed by the phrase "computer-readable medium" or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

As used herein, the term "or" is inclusive unless otherwise explicitly noted. Thus, the phrase "at least one of A, B, or C"

is satisfied by any element from the set {A, B, C} or any combination thereof, including multiples of any element.

While the disclosure has been described with reference to example embodiments, it will be understood by those skilled in the art that various changes may be made and equivalents may be substituted for elements thereof without departing from the scope of the disclosure. In addition, many modifications may be made to adapt a particular system, device, or component thereof to the teachings of the disclosure without departing from the scope thereof. Therefore, it is intended that the disclosure not be limited to the particular embodiments disclosed for carrying out this disclosure, but that the disclosure will include all embodiments falling within the scope of the appended claims.

What is claimed is:

1. An electronic device comprising:
a memory having stored thereon an adaptive alarm management (AAM) module for managing at least one alarm of the electronic device; and
at least one processor communicatively coupled to the memory, the at least one processor executing program code of the adaptive alarm management module, which enables the electronic device to:
detect activation of a first alarm, the first alarm set to trigger at a first time;
monitor for receipt of incoming communications that are not attended to by a user of the electronic device;
identify that an incoming communication contains at least one information that warrants performing an alarm modification corresponding to the first alarm; and
in response to identifying that the incoming communication contains the at least one information that warrants performing an alarm modification corresponding to the first alarm:
determine a time adjustment period based on the at least one information;
adjust the first time, by the time adjustment period, to generate a second time; and
update the first alarm to be triggered at the second time.

2. The electronic device of claim 1, wherein to identify that the incoming communication contains the at least one information that warrants performing the alarm modification, the at least one processor:
processes the at least one incoming communication through an artificial intelligence engine, which parses the at least one incoming communication to retrieve identifying data corresponding to the first alarm, the identifying data including at least one of:
(i) a first event identifier (ID) that substantially matches a referenced first alarm event ID associated with stored contextual information of the first alarm;
(ii) a second event ID and information corresponding to a second alarm event that is scheduled to occur at a second event time and which requires an earlier triggering of the alarm to enable the user to be alerted/informed about the second event before a scheduled time of the second event; and
(iii) alarm modifying information that alters or modifies at least one scheduling aspect corresponding to a first event that is initially scheduled for after the first alarm, the alarm modifying information includes at least one of: (a) cancelation of the first event; (b) a first event time being moved to a later time than originally scheduled relative to the first time of the first alarm and (c) the first event time being moved to an earlier time.

3. The electronic device of claim 2, wherein the time adjustment period is determined based on a corresponding one of (i) the first or the second event time and (ii) the first time of the first alarm and (iii) heuristically determined or user established adjustment times, based on a type of an event.

4. The electronic device of claim 1, wherein the at least one processor:

detects a wake-up event of the electronic device from a sleep mode; and in response to detecting the wake-up event, presents, on a display, a first graphical user interface (GUI) that includes a notification that the first time was changed to the second time and the at least one incoming communication that contained the at least one information warranting the alarm modification.

5. The electronic device of claim 1, wherein the at least one processor:

determines whether an incoming communication is one of a pre-approved set of important communications from among communications received from at least one of (i) a high priority contact, and (ii) a type of communication that is pre-identified as being an important communication; and in response to determining that the incoming communication is one of the pre-approved set of important communications, performs the adjustment of the first time.

6. The electronic device of claim 1, wherein the at least one processor presents, on a display, a first alarm configuring graphical user interface (GUI) that comprises:

a first user-selectable option to allow incoming communications that contain the at least one information warranting the alarm modification to be used for subsequent modifications to the first time of the first alarm.

7. The electronic device of claim 1, wherein the at least one processor:

presents, on a display, a first alarm configuring graphical user interface (GUI) that comprises a second user-selectable option to prevent subsequently-received incoming communications that contain similar information from being used to trigger subsequent modifications to subsequent first alarms;

receives a selection to activate the second user selectable option; and in response to receiving a subsequently-received incoming communication having similar information, while a subsequent first alarm is scheduled and the second user selectable option is activated, prevents the subsequently-received incoming communication from triggering any modification to the subsequent first alarm.

8. The electronic device of claim 1, wherein the at least one processor:

presents, on a display, a first alarm configuring graphical user interface (GUI) that includes at least one user-selectable option from among:

(i) enabling dynamic modification of the first time of the first alarm to a time that is after the first time;

(ii) enabling dynamic modification of the first time of the first alarm to a time that is before the first time; and (iii) enabling dynamic modification of the first time of the first alarm to a time that is either before or after the first time; and implements a corresponding time adjustment to the first time based on the selected one of the at least one user-selectable option.

9. A method comprising:

detecting, via at least one processor of an electronic device configured with alarm functionality, activation of a first alarm, the first alarm set to trigger at a first time;

monitoring for receipt of incoming communications that are not attended to by a user of the electronic device;

identifying that an incoming communication contains at least one information that warrants performing an alarm modification corresponding to the first alarm; and in response to identifying that the incoming communication contains the at least one information that warrants performing an alarm modification corresponding to the first alarm:

determining a time adjustment period based on the at least one information message;

adjusting the first time, by the time adjustment period, to generate a second time; and updating the first alarm to be triggered at the second time.

10. The method of claim 9, wherein to identify that the incoming communication contains the at least one information that warrants performing the alarm modification, the method further comprising:

processing the at least one incoming communication through an artificial intelligence engine, which parses the at least one incoming communication to retrieve identifying data corresponding to the first alarm, the identifying data including at least one of:

(i) a first event identifier (ID) that substantially matches a referenced first alarm event ID associated with stored contextual information of the first alarm;

(ii) a second event ID and information corresponding to a second alarm event that is scheduled to occur at a second event time and which requires an earlier triggering of the alarm to enable the user to be alerted/informed about the second event before a scheduled time of the second event; and (iii) alarm modifying information that alters or modifies at least one scheduling aspect corresponding to a first event that is initially scheduled for after the first alarm, the alarm modifying information includes at least one of: (a) cancelation of the first event; (b) a first event time being moved to a later time than originally scheduled relative to the first time of the first alarm and (c) the first event time being moved to an earlier time.

11. The method of claim 10, wherein the time adjustment period is determined based on (i) a corresponding one of the first or the second event time and (ii) the first time of the first alarm and (iii) heuristically determined or user established adjustment times, based on a type of an event.

12. The method of claim 9, further comprising:

detecting a wake-up event of the electronic device from a sleep mode; and in response to detecting the wake-up event, presenting, on a display, a first graphical user interface (GUI) that includes a notification that the first time was changed to the second time and the at least one incoming communication that contained the at least one information warranting the alarm modification.

13. The method of claim 9, further comprising:

determining whether an incoming communication is one of a pre-approved set of important communications from among communications received from at least one of (i) a high priority contact, and (ii) a type of communication that is pre-identified as being an important communication; and in response to determining that the incoming communication is one of the pre-approved set of important communications, performing the adjustment of the first time.

14. The method of claim 9, further comprising presenting, on a display, a first alarm configuring graphical user interface (GUI) that comprises a first user-selectable option to allow incoming communications that contain the at least one information warranting an alarm modification to be used for subsequent modifications to the first time of the first alarm.

15. The method of claim 9, further comprising:

presenting, on a display, a first alarm configuring graphical user interface (GUI) that comprises a second user-selectable option to prevent subsequently-received incoming communications that contain similar information from being used to trigger subsequent modifications to subsequent first alarms;

receiving a selection to activate the second user selectable option; and in response to receiving a subsequently-received incoming communication having similar information, while a subsequent first alarm is scheduled and the second user selectable option is activated, preventing the subsequently-received incoming communication from triggering any modification to the subsequent first alarm.

16. The method of claim 9, further comprising:

presenting, on a display, a first alarm configuring graphical user interface (GUI) that includes at least one user-selectable option from among:

(i) enabling dynamic modification of the first time of the first alarm to a time that is after the first time;

(ii) enabling dynamic modification of the first time of the first alarm to a time that is before the first time; and (iii) enabling dynamic modification of the first time of the first alarm to a time that is either before or after the first time; and implementing a corresponding time adjustment to the first time based on the selected one of the at least one user-selectable option.

17. A computer program product comprising:

a computer readable storage device having stored thereon program code which, when executed by at least one processor of an electronic device having a memory, enables the electronic device to complete the functionality of:

detecting activation of a first alarm, the first alarm set to trigger at a first time;

monitoring for receipt of incoming communications that are not attended to by a user of the electronic device;

identifying that an incoming communication contains at least one information that warrants performing an alarm modification corresponding to the first alarm; and in response to identifying that the incoming communication contains the at least one information that warrants performing the alarm modification corresponding to modify the first alarm:

determining a time adjustment period based on the at least one information;

adjusting the first time, by the time adjustment period, to generate a second time; and updating the first alarm to be triggered at the second time.

18. The computer program product of claim 17, wherein to identify that the incoming communication contains the at least one information that warrants performing the alarm modification, the program code comprises program code that further enables the electronic device to complete the functionality of:

processing the at least one incoming communication through an artificial intelligence engine, which parses the at least one incoming communication to retrieve identifying data corresponding to the first alarm, the identifying data including at least one of:

(i) a first event identifier (ID) that substantially matches a referenced first alarm event ID associated with stored contextual information of the first alarm;

(ii) a second event ID and information corresponding to a second alarm event that is scheduled to occur at a second event time and which requires an earlier triggering of the alarm to enable the user to be alerted/informed about the second event before a scheduled time of the second event; and (iii) alarm modifying information that alters or modifies at least one scheduling aspect corresponding to a first event that is initially scheduled for after the first alarm, the alarm modifying information includes at least one of: (a) cancelation of the first event; (b) a first event time being moved to a later time than originally scheduled relative to the first time of the first alarm and (c) the first event time being moved to an earlier time.

19. The computer program product of claim 18, wherein:

the time adjustment period is determined based on a corresponding one of (i) the first or the second event time and (ii) the first time of the first alarm and (iii) heuristically determined or user established adjustment times, based on a type of an event.

20. The computer program product of claim 17, wherein the program code comprises program code that further enables the electronic device to complete the functionality of:

presenting, on a display, a first alarm configuring graphical user interface (GUI) that comprises:

a first user-selectable option to allow incoming communications that contain the at least one information warranting the alarm modification to be used for subsequent modifications to the first time of the first alarm.

* * * * *